United States Patent [19]

Chang

[11] Patent Number: 5,614,323
[45] Date of Patent: Mar. 25, 1997

[54] POWDER COATING COMPOSITIONS

[75] Inventor: Yeong-Ho Chang, Kingsport, Tenn.

[73] Assignee: Eastman Chemical Company, Kingsport, Tenn.

[21] Appl. No.: 631,433

[22] Filed: Apr. 12, 1996

Related U.S. Application Data

[63] Continuation of Ser. No. 410,591, Mar. 27, 1995, abandoned, which is a continuation of Ser. No. 681,021, Apr. 5, 1991, abandoned, which is a continuation-in-part of Ser. No. 438,128, Nov. 20, 1989, abandoned.

[51] Int. Cl.$^6$ .......................... C08L 67/02; C08L 75/06; B32B 27/40
[52] U.S. Cl. .................... 428/425.8; 525/440; 525/934
[58] Field of Search .................. 525/440, 934; 428/425.8

[56] References Cited

U.S. PATENT DOCUMENTS

| | | |
|---|---|---|
| 3,385,831 | 5/1968 | Watson . |
| 4,352,924 | 10/1982 | Wooten et al. ................ 528/302 |
| 4,413,079 | 11/1983 | Disteldorf et al. .............. 525/440 |
| 4,442,270 | 4/1984 | Passmore et al. . |
| 4,855,382 | 8/1989 | Vanhaeren .................... 528/45 |
| 4,859,760 | 8/1989 | Light et al. . |

FOREIGN PATENT DOCUMENTS

| | | |
|---|---|---|
| 0070118 | 1/1983 | European Pat. Off. . |
| 3328133 | 2/1985 | Germany . |
| 8905320 | 6/1989 | WIPO . |

OTHER PUBLICATIONS

"Cross-Linking Agents For Powder Coatings", Huls America Inc. Aug. 1988.

*Primary Examiner*—Thomas Hamilton, III
*Attorney, Agent, or Firm*—Bernard J. Graves, Jr.; Harry J. Gwinnell

[57] ABSTRACT

Disclosed are thermosetting, powder coating compositions comprised of a blend of semi-crystalline and amorphous polyesters and certain adducts of the 1,3-diazetidine-2,4-dione dimer of isophorone diisocyanate which are readily curable at temperatures and times commonly used to cure (cross-link) powder coatings. When using equivalent curing conditions, the disclosed coating compositions exhibit a higher degree of cross-linking than do combinations of amorphous polyesters alone and the adducts of the 1,3-diazetidine-2,4-dione dimer of isophorone diisocyanate.

31 Claims, No Drawings

POWDER COATING COMPOSITIONS

This application is a continuation of application No. 08/410,591, filed Mar. 27, 1995, now abandoned; which is a continuation of 07/681,021, filed Apr. 5, 1991, abandoned; which is a continuation-in-part of 07/438,1228, filed Nov. 20, 1989, now abandoned.

FIELD OF THE INVENTION

This invention concerns novel powder coating compositions. More particularly, this invention concerns novel polymer compositions comprising certain semi-crystalline polyesters, certain amorphous polyesters, and certain adducts of the 1,3-diazetidine-2,4-dione dimer of isophorone diisocyanate and a diol. This invention also concerns powder coating compositions based on the polymer compositions and coatings produced from the powder coating compositions.

BACKGROUND OF THE INVENTION

Thermosetting powder coating compositions are used extensively to produce durable protective coatings on various materials. Thermosetting coatings, when compared to coatings derived from thermoplastic compositions, generally are tougher, more resistant to solvents and detergents, have better adhesion to metal substrates, and do not soften when exposed to elevated temperatures. However, the curing of thermosetting coatings has created problems in obtaining coatings which have, in addition to the above-stated desirable characteristics, good smoothness and flexibility. Coatings prepared from thermosetting powder compositions, upon the application of heat, may cure or set prior to forming a smooth coating, resulting in a relatively rough or non-uniform finish. Such a coating surface or finish lacks the gloss and luster of coatings typically obtained from thermoplastic compositions. The rough or non-uniform surface problem has caused thermo-setting coatings to be applied from organic solvent systems which are inherently undesirable because of the environmental and safety problems occasioned by the evaporation of the solvent system. Solvent-based coating compositions also suffer from the disadvantage of relatively poor percent utilization, i.e., in some modes of application, only 60 percent or less of the solvent-based coating composition being applied contacts the article or substrate being coated. Thus, a substantial portion of solvent-based coatings can be wasted since that portion which does not contact the article or substrate being coated obviously cannot be reclaimed.

To produce smooth, glossy, uniform coatings, the polymeric materials constituting powder coating compositions must melt within a particular temperature range to permit timely and ample flow of the polymeric material prior to the occurrence of any significant degree of curing, i.e., cross-linking. Powder coating compositions which possess the requisite melting range provide smooth and glossy coatings upon being heated to cure the compositions. In addition to being smooth and glossy, coatings derived from thermosetting coating compositions should exhibit or possess good impact strength, hardness, flexibility, and resistance to solvents and chemicals. For example, good flexibility is essential for powder coating compositions used to coat sheet (coil) steel which is destined to be formed or shaped into articles used in the manufacture of various household appliances and automobiles wherein the sheet metal is flexed or bent at various angles.

It is essential that powder coating compositions remain in a free-flowing, finely divided state for a reasonable period after they are manufactured and packaged. Thus, amorphous polyesters utilized in powder coating formulations desirably possess a glass transition temperature (Tg) higher than the storage temperatures to which the formulations will be exposed. Semi-crystalline polyesters and blends thereof with amorphous polyesters also may be utilized in powder coating formulations. For this application, semi-crystalline polyesters desirably possess a significant degree of crystallinity to prevent caking or sintering of the powder for a reasonable period of time prior to its application to a substrate. Semi-crystalline polyesters used in powder coating formulations also must have melting temperature low enough to permit the compounding of the powder coating formulation without causing the cross-linking agent to react prematurely with the polyesters. The lower melting temperature of the semi-crystalline polyester also is important to achieving good flow of the coating prior to curing and thus aids the production of smooth and glossy coatings.

Finally, the production of tough coatings which are resistant to solvents and chemicals requires adequate cross-linking of the powder coating compositions at curing temperatures and times commonly employed in the industry. In the curing of powder coating compositions, a coated article typically is heated at a temperature in the range of about 325° to 400° F. (163°–204° C.) for up to about 20 minutes causing the coating particles to melt and flow followed by reaction of the cross-linking (curing) agent with the polyester. The degree of curing may be determined by the methyl ethyl ketone rub test described hereinbelow. Normally, a thermosetting coating is considered to be completely or adequately cross-linked if the coating is capable of sustaining 200 double rubs. It is apparent that the use of lower temperatures and/or shorter curing times to produce adequately cross-linked coatings is very advantageous since higher production rates and/or lower energy costs can be achieved thereby.

Powder coating systems based on hydroxyl polyesters and caprolactam-blocked polyisocyanate cross-linking agents have been used extensively in the coatings industry. The most widely used caprolactam-blocked polyisocyanates are those commonly referred to as $\epsilon$-caprolactam-blocked isophorone diisocyanate, e.g., those described in U.S. Pat. Nos. 3,822,240, 4,150,211, and 4,212,962. However, the products marketed as $\epsilon$-caprolactam-blocked isophorone diisocyanate may consist primarily of the blocked, difunctional, monomeric isophorone diisocyanate, i.e., a mixture of the cis and trans isomers of 3-isocyanatomethyl-3,5,5-trimethylcyclohexylisocyanate, the blocked, difunctional dimer thereof, the blocked, trifunctional trimer thereof or a mixture of the monomeric, dimeric and/or trimeric forms. For example, the blocked polyisocyanate compound used as the cross-linking agent may be a mixture consisting primarily of the $\epsilon$-caprolactam-blocked, difunctional, monomeric isophorone diisocyanate and the $\epsilon$-caprolactam-blocked, trifunctional trimer of isophorone diisocyanate. The reaction of the isocyanato groups with the blocking compound is reversible at elevated temperatures, e.g., about 150° C. and above, at which temperature the isocyanato groups are available to react with the hydroxyl groups present on the polyester to form urethane linkages, thereby cross-linking or curing the coating composition.

During the curing process using an $\epsilon$-caprolactam-blocked polyisocyanate as described above, $\epsilon$-caprolactam is liberated from the powder coating compositions. To eliminate the presence of $\epsilon$-caprolactam from the workplace, adducts of the 1,3-diazetidine-2,4-dione dimer of isophorone diisocyanate and diols have been developed for use as cross-linking agents in powder coating compositions. Such adducts and powder coating compositions containing the adducts are described in the literature such as, for example, U.S. Pat. No. 4,413,079, German OLS 3,328,133, and the Journal of Chromatography, 472 (1989) 175–195. While these oligomeric cross-linking agents avoid the liberation of ε-caprolactam, they possess the disadvantage of not being as reactive as the ε-caprolactam-blocked polyisocyanates when used in combination with commercially-available, amorphous polyesters. Thus, powder coatings based on amorphous polyesters commonly used in the powder coating industry and adducts of the 1,3-diazetidine-2,4-dione dimer of isophorone diisocyanate must be heated at higher temperatures, e.g., 400° F. (204° C.) as compared to 350° F. (177° C.) for caprolactam-blocked isophorone diisocyanate, and/or for longer periods of time to provide adequately cured coatings. However, the use of such higher temperatures does not produce the degree of cross-linking necessary to impart to the cured coating a satisfactory combination of properties, especially resistance to chemicals and solvents.

DETAILED DESCRIPTION OF THE INVENTION

I have discovered that coatings having good to excellent gloss, hardness, impact strength (toughness), flexibility, and resistance to solvents and chemicals may be obtained by the use of conventional curing conditions by the inclusion in powder coating compositions of a blend of a semi-crystalline polyester, an amorphous polyester, and an adduct of the 1,3-diazetidine-2,4-dione dimer of isophorone diisocyanate. The powder coating compositions provided by this invention thus comprise an intimate blend, typically in a finely divided form, of:

(1) a hydroxyl polyester component comprised of:
(A) 75 to 20 weight percent, based on the weight of the hydroxyl polyester component, of a semi-crystalline polyester having a Tg of less than 50° C., a hydroxyl number of about 20 to 100, an inherent viscosity of about 0.1 to 0.5, a melting range of about 70° to 150° C., a number average molecular weight of about 1500 to 10,000, and a heat of fusion (second heating cycle of DSC) of greater than about 5 cal/g-°C., e.g. 5 to about 20 cal/g-°C.; and
(B) 25 to 80 weight percent of an amorphous polyester having a glass transition temperature (Tg) of greater than 40° C., a hydroxyl number of about 20 to 100 and an inherent viscosity of about 0.1 to 0.5; and (2) a cross-linking effective amount of an adduct of the 1,3-diazetidine-2,4-dione dimer of isophorone diisocyanate and a diol having the structure

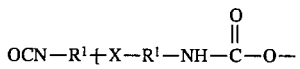

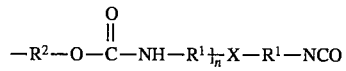

wherein
$R^1$ is a divalent 1-methylene-1,3,3-trimethyl-5-cyclohexyl radical, i.e., a radical having the structure

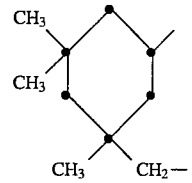

$R^2$ is a divalent aliphatic, cycloaliphatic, araliphatic or aromatic residue of a diol; and X is a 1,3-diazetidine-2,4-dionediyl radical, i.e., a radical having the structure

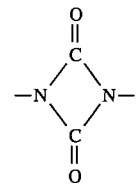

wherein the ratio of NCO to OH groups in the formation of the adduct is about 1:0.5 to 1:0.9, the mole ratio of diazetidinedione to diol is from 2:1 to 6:5, the content of free isocyanate groups in the adduct is not greater than 8 weight percent and the adduct has a molecular weight of about 500 to 4000 and a melting point of about 70° to 130° C.

I have discovered that the above-described semi-crystalline polyester/amorphous polyester blend possesses substantially greater reactivity with the above-described cross-linking adduct than is possessed by amorphous polyesters(alone) commonly used in powder coating compositions. The presence of the semi-crystalline polyester in the powder coating compositions provided by this invention in a concentration of as little as 20% permits the curing of the coating compositions using lower temperatures and/or shorter periods of time.

In the above composition, it is preferred that components 1(A) and (B), above, are present in a ratio range of about 30/70 (A:B) to about 60/40, most preferably about 50/50 (A:B).

Both the amorphous polyester and the semi-crystalline polyester may be produced using well-known polycondensation procedures employing an excess of diol to obtain a polymer having the specified hydroxyl number.

The glycol residues of the amorphous polyester component may be derived from a wide variety and number of aliphatic, alicyclic and alicyclic-aromatic glycols or diols containing from 2 to about 10 carbon atoms. Examples of such glycols include ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, thiodiethanol, 1,2-, 1,3- and 1,4-cyclohexanedimethanol, 2,2,4,4-tetramethyl-1,3-cyclobutanediol, 1,4-xylylene-diol and the like.

The dicarboxylic acid residues of the amorphous polyester may be derived from various aliphatic, alicyclic, aliphatic-alicyclic and aromatic dicarboxylic acids containing about 4 to 10 carbon atoms or ester-forming derivatives thereof such as dialkyl esters and/or anhydrides. Succinic, glutaric, adipic, azelaic, sebacic, fumaric, maleic, itaconic, 1,3- and 1,4-cyclohexanedicarboxylic, phthalic, isophthalic and terephthalic are representative of the dicarboxylic acids from which the diacid residues of the amorphous polyester may be derived. A minor amount, e.g., up to about 10 mole percent, of the glycol and/or diacid residues may be replaced with branching agents, e.g., tri-functional residues derived from trimethylolethane, trimethylolpropane, and trimellitic anhydride.

The preferred amorphous polyester component of the composition provided by this invention has a Tg greater than 55° C., e.g., from 55° to 80° C., a hydroxyl number in the range of about 25 to 80, an acid number of not more than 15 and an inherent viscosity of about 0.15 to 0.4. As used herein, the term "amorphous" refers to a polyester which exhibits no, or only a trace of, crystallization or melting point as determined by differential scanning calorimetry (DSC). The amorphous polyester component preferably is comprised of (1) diacid residues of which at least 50 mole percent are terephthalic acid residues, (2) glycol residues of which at least 50 mole percent are derived from 2,2-dimethyl-1,3-propanediol (neopentyl glycol) and (3) up to 10 mole percent, based on the total moles of (1), (2) and (3), of trimethylolpropane residues. These preferred amorphous polyesters are commercially available, e.g., under the names-RUCOTE 107, Cargill Resin 3000, UCB E3145, Hoechst AN745, Scado Uralac 2115 and Uralac 2504, and/or can be prepared according to the procedures described in U.S. Pat. Nos. 3,296,211, 3,842,021, 4,124,570, 4,264,751, and 4,413,079 and Published Japanese Patent Applications (Kokai) 73-05,895 and 73-26,292. The most preferred amorphous polyester consists essentially of terephthalic acid residues, 2,2-dimethyl-1,3-propanediol residues and up to 10 mole percent, based on the total moles of trimethylolpropane and 2,2-dimethyl-1,3-propanediol residues, of trimethylolpropane residues and having a Tg of about 50° to 65° C. a hydroxyl number of about 35 to 60, an acid number of less than 10 and an inherent viscosity of about 0.1 to 0.25.

Examples of the semi-crystalline polyesters which may be used in the manufacture of my novel compositions are set forth in U.S. Pat. No. 4,859,760. Suitable semi-crystalline polyesters meeting the criteria set forth hereinabove include polyesters comprised of (1) a diacid component comprised of at least 50, preferably at least 90 mole percent terephthalic or 1,4-cyclohexane-dicarboxylic acid residues and (2) diol residues comprised of about 0 to 20 mole percent 2,2-dimethyl-1.3-propanediol residues and about 80 to 100 mole percent of residues of one or more diols having the formula —O—$(CH_2)_n$—O— wherein n is 4 to about 12. The semi-crystalline polyester preferably is comprised of (1) diacid residues comprised of (a) about 80 to 98 mole percent terephthalic acid residues and (b) about 2 to 20 mole percent of 1,4-cyclohexanedicarboxylic acid residues, 1,3-cyclohexanedicarboxylic acid residues, adipic acid residues or a mixture thereof, and (2) diol residues comprised of at least about 50 mole percent of residues having the formula —O—$(CH_2)_n$—O— wherein n is 4 to about 12.

The semi-crystalline polyester component, in addition to the residues specified hereinabove, may contain minor amounts, e.g., up to 10 mole percent based upon the total monomer residues of the polyester, of other diacid and diol residues such as the residues of ethylene glycol, propylene glycol, 1,3-propanediol, 2,4-dimethyl-2-ethylhexane-1,3-diol, 2-ethyl-2-butyl-1,3-propanediol, 2-ethyl-2-isobutyl-1,3-propanediol, 1,3-butanediol, thiodiethanol, 1,2-, 1,3- and 1,4-cyclohexanedimethanol, 2,2,4,4-tetramethyl-1,3-cyclobutanediol, 1,4-xylylenediol and residues of succinic, glutaric, adipic, azelaic, sebacic, fumaric, maleic, itaconic, phthalic and/or isophthalic acids. The 1,3- and 1,4-cyclohexane-dicarboxylic acid or the dialkyl esters thereof used in the preparation of the polyesters may be the trans isomer, the cis isomer, or a mixture of such isomers. Preferably, the cis:trans ratio is in the range of about 30:70 to about 70:30.

The semi-crystalline polyester component of our novel compositions preferably has a Tg of less than about 30° C., e.g., about 0° to 30° C., a hydroxyl number of about 30 to 80, an inherent viscosity of about 0.1 to 0.5, a melting range of about 90° to 140° C. and a number average molecular weight of about 2000 to 6000. The heat of fusion (second heating cycle of DSC) of the preferred semi-crystalline polyesters is greater than about 8 cal/g-°C., e.g., from about 8 to 15 cal/g-°C. Semi-crystalline polyesters are those that exhibit an endothermic transition on a differential scanning calorimetry (DSC) scan from low to high temperature. Such a transition also is referred to as melting, a destruction of the orderly arranged molecular structure. The preferred semi-crystalline polyesters comprise (1) diacid residues consisting essentially of about 85 to 95 mole percent terephthalic acid residues and about 5 to 15 mole percent 1,3-cyclohexanedicarboxylic or 1,4-cyclohexanedicarboxylic acid residues, preferably having a trans isomer content of about 35 to 65 mole percent and (2) diol residues consisting essentially of residues having the formula —O—$(CH_2)_n$—O— wherein n is 6 to 12, especially 1,6-hexanediol.

The relative amounts of the amorphous polyester and the semi-crystalline polyester can be varied substantially depending on a number of factors such as the properties and characteristics of the particular amorphous polyester and semi-crystalline polyester employed, the cross-linking agent and the amount thereof being used, the degree of pigment loading, the properties required of the coatings to be prepared from the compositions, etc. In a preferred embodiment of my invention, the hydroxyl polyester component consists entirely of the semi-crystalline polyester to a weight ratio of semi-crystalline polyester to amorphous polyester up to about 30:70.

The adducts of the 1,3-diazetidine-2,4-dione dimer of isophorone diisocyanate and a diol are prepared according to the procedures described in U.S. Pat. No. 4,413,079 by reacting the diazetidine dimer of isophorone diisocyanate, preferably free of isocyanurate trimers of isophorone diisocyanate, with diols in a ratio of reactants which gives as isocyanto:hydroxyl ratio of about 1:0.5 to 1:0.9, preferably 1:0.6 to 1:0.8. The adduct preferably has a molecular weight of 1450 to 2800 and a melting point of about 85° to 120° C. The preferred diol reactant is 1,4-butanediol. Such an adduct is commercially available under the name Hüls BF1540.

The amount of the cross-linking adduct present in the compositions of this invention can be varied depending on several factors such as those mentioned hereinabove relative to the amounts of amorphous polyester and semi-crystalline polyester utilized. Typically, the amount of cross-linking adduct which will effectively cross-link the hydroxy-containing polymers to produce coatings having a good combination of properties is in the range of about 5 to 30 weight percent, preferably 10 to 25 weight percent, based on the total weight of the amorphous polyester, the semi-crystalline polyester and the cross-linking compound.

The cross-linking component of the compositions may contain a minor amount, e.g., up to about 30 weight percent based on the total weight of the cross-linking component, of another blocked polyisocyanate such as those which are based on isophorone diisocyanate blocked with ε-caprolactam, commercially available as Hüls B1530, Ruco NI-2 and Cargill 2400, or toluene 2,4-diisocyanate blocked with ε-caprolactam, commercially available as Cargill 2450, and phenol-blocked hexamethylene diisocyanate. The presence of minor amounts of such blocked polisocyanates has been found to provide good cross-linking at temperatures as low as 325° F. (163° C.) with the liberation of very minor amounts of the blocking agent, e.g., ε-caprolactam.

The powder coating compositions of our invention may be prepared from the compositions described herein by dry-mixing and then melt-blending the semi-crystalline polyester, the amorphous polyester if present and the cross-linking adduct, along with other additives commonly used in powder coatings, and then grinding the solidified blend to a particle size, e.g., an average particle size in the range of about 10 to 300 microns, suitable for producing powder coatings. For example, the ingredients of the powder coating composition may be dry blended and then melt blended in a ZSK twin-screw extruder at 90° to 130° C., granulated and finally ground. The melt blending should be carried out at a temperature sufficiently low to prevent the conversion of the cross-linking adduct to a reactive form and thus avoid premature cross-linking. To minimize the exposure of the cross-linking adduct to elevated temperatures, the amorphous and semi-crystalline polyesters may be blended prior to the incorporation therein of the cross-linking agent.

Typical of the additives which may be present in the powder coating compositions include benzoin, used to reduce entrapped air or volatiles, flow aids or flow control agents which aid the formation of a smooth, glossy surface, catalysts to promote the cross-linking reaction between the isocyanate groups of the cross-linking agent, and the hydroxyl groups on the polymers, stabilizers, pigments, and dyes. Although it is possible to cure or cross-link the composition without the use of a catalyst, it is usually desirable to employ a catalyst to aid the cross-linking reaction, e.g., in an amount of about 0.05 to 2.0 weight percent cross-linking catalyst based on the total weight of the amorphous and semi-crystalline polyesters and the cross-linking agent. Suitable catalysts for promoting the cross-linking include organo-tin compounds such as dibutyltin dilaurate, dibutyltin dimaleate, dibutyltin oxide, stannous octanoate and similar compounds.

The powder coating compositions preferably contain a flow aid, also referred to as flow control or leveling agents, to enhance the surface appearance of cured coatings of the powder coating compositions. Such flow aids typically comprise acrylic polymers and are available from several suppliers, e.g., Modaflow from Monsanto Company and Acronal from BASF. Other flow control agents which may be used include Modarez MFP available from Synthron, EX 486 available from Troy Chemical, BYK 360P available from BYK Mallinkrodt and Perenol F-30-P available from Henkel. A specific flow aid is an acrylic polymer having a molecular weight of about 17,000 and containing 60 mole percent 2-ethylhexyl methacrylate residues and about 40 mole percent ethyl acrylate residues. The amount of flow aid present may be in the range of about 0.5 to 4.0 weight percent, based on the total weight of the amorphous and semi-crystalline polyesters and the cross-linking agent.

The powder coating compositions may be deposited on various metallic and non-metallic substrates by known techniques for powder deposition such as by means of a powder gun, by electrostatic deposition or by deposition from a fluidized bed. In fluidized bed sintering, a preheated article is immersed into a suspension of the powder coating in air. The particle size of the powder coating composition normally is in the range of 60 to 300 microns. The powder is maintained in suspension by passing air through a porous bottom of the fluidized bed chamber. The articles to be coated are preheated to about 250° to 400° F. (about 121° to 205° C.) and then brought into contact with the fluidized bed of the powder coating composition. The contact time depends on the thickness of the coating that is to be produced and typically is from 1 to 12 seconds. The temperature of the substrate being coated causes the powder to flow and thus fuse together to form a smooth, uniform, continuous, uncratered coating. The temperature of the preheated article also affects cross-linking of the coating composition and results in the formation of a tough coating having a good combination of properties. Coatings having a thickness between 200 and 500 microns may be produced by this method.

The compositions also may be applied using an electrostatic process wherein a powder coating composition having a particle size of less than 100 microns, preferably about 15 to 50 microns, is blown by means of compressed air into an applicator in which it is charged with a voltage of 30 to 100 kV by high-voltage direct current. The charged particles then are sprayed onto the grounded article to be coated to which the particles adhere due to the electrical charge thereof. The coated article is heated to melt and cure the powder particles. Coating of 40 to 120 microns thickness may be obtained.

Another method of applying the powder coating compositions is the electrostatic fluidized bed process which is a combination of the two methods described above. For example, annular or partially annular electrodes are mounted over a fluidized bed so as to produce an electrostatic charge such as 50 to 100 kV. The article to be coated, either heated, e.g., 250° to 400° F., or cold, is exposed briefly to the fluidized powder. The coated article then can be heated to effect cross-linking if the article was not preheated to a temperature sufficiently high to cure the coating upon contact of the coating particles with the article.

The powder coating compositions of this invention may be used to coat articles of various shapes and sizes constructed of heat-resistant materials such as glass, ceramic and various metal materials. The compositions are especially useful for producing coatings on articles constructed of metals and metal alloys, particularly steel articles.

The compositions and coatings of our invention are further illustrated by the following examples. The inherent viscosities (I.V.; dl/g) referred to herein were measured at 25° C. using 0.5 g polymer per 100 mL of a solvent consisting of 60 parts by weight phenol and 40 parts by weight tetrachloroethane. Melt viscosities (poise) were determined using an ICI melt viscometer according to ASTM D4287-83. Acid and hydroxyl numbers were determined by titration and are reported herein as mg of KOH consumed for each gram of polymer. The glass transition temperatures (Tg) and the melting temperatures (Tm) were determined by differential scanning calorimetry (DSC) on the second heating cycle at a scanning rate of 20° C. per minute after the sample was heated to melt and quenched to below the Tg of the polymer. Tg values are reported as the midpoint of the transition and Tm at peaks of transitions. The weight average molecular weight (Mw) and number average molecular weight (Mn) were determined by gel permeation chromatography in tetrahydrofuran (THF) using a polystyrene standard and a UV detector.

Coatings were prepared on 3 inch by 9 inch panels of 24-gauge, polished, cold roll steel, the surface of which has been zinc phosphated (Bonderite 37, The Parker Company). Impact strengths were determined using an impact tester (Gardner Laboratory, Inc.) according to ASTM D2794-84. A weight with a ⅝-inch diameter, hemispherical nose was dropped within a slide tube from a specified height to drive into the front (coated face) or back of the panel. The highest impact which did not crack the coating was recorded in inch-pounds, front and reverse. The 20° and 60° gloss values were measured using a multi-angle, analog laboratory glossmeter.

The solvent resistance and the degree of cure (crosslinking) of the coatings were determined by a methyl ethyl ketone (MEK) rub procedure in which coated panels were rubbed with a two-pound ball peen hammer wrapped with cheese cloth approximately 0.5 inch thick. The cloth was wetted with MEK every 50 double strokes. The rubbing was continued until bare metal is observed or until 200 double rubs are completed. The result of each MEK rub procedure is reported as the number of double rubs required for the observation of bare metal or 200, whichever is greater.

The flexibility of the coatings was determined in accordance with ASTM 4145-83 at ambient temperature by bending or folding a coated panel back against itself, using a hydraulic jack pressurized to 20,000 pounds per square inch (psi), until the apex of the bend is as flat as can be reasonably achieved. This bend is referred to as 0T meaning that there is nothing (zero thicknesses) between the bent portions of the panel. The bend is examined using a 10X magnifying glass and a pass is recorded if no fractures of the coating are observed.

The following reference examples describe the preparation of semi-crystalline polyesters which may be employed in the compositions provided by this invention.

EXPERIMENTAL SECTION

REFERENCE EXAMPLE 1

Terephthalic acid (2092.8 g, 12.60 mol), 1,4-cyclohexanedicarboxylic acid (cis:trans=about 60:40, 114.2 g, 0.66 mol), and butanestannoic acid (FASCAT 4100, 3.5 g) were added to a melt of 1,6-hexanediol (1797 g, 15.20 mol) in a 5 L, 3-necked, round-bottom flask. The contents of the flask were swept with 1.0 standard cubic feet per hour (scfh) nitrogen and heated to 200° C. over a period of about 30 minutes. The reaction mixture was heated at 200° C. for 3 hours, at 210° C. for 2 hours and at 220° C. for 1 hour. The temperature then was raised to and maintained at 230° C. until the acid number of the polyester was less than 10. The molten polymer was poured into a syrup can where it was allowed to cool to a white solid. The polyester thus obtained had an I.V. of 0.224, an ICI melt viscosity at 200° C. of 3.3 poise, a hydroxyl number of 42.5 and an acid number of 2.3. Differential scanning calorimetry showed a melting point at 135° C. and a heat of fusion of 10.9 cal/g. No temperature of crystallization was observed. The crystallization half time from the melt at 95° C. was 11 seconds and at 60° C. was too fast to observe. The polyester had a weight average molecular weight of 9027 and a number average molecular weight of 3666 (Mw/Mn=2.5).

REFERENCE EXAMPLE 2

Terephthalic acid (519.6 g, 3.127 mol) and butanestannoic acid (FASCAT 4100, 0.8 g) were added to a melt of 1,6-hexanediol (370.9 g, 3.139 mol) and trimethylolpropane (22.2 g, 0.165 mol) in a 1 L, 3 -necked, round-bottom flask. The contents of the flask were swept with 1.0 standard cubic feet per hour (scfh) nitrogen and heated to 200° C. over a period of about 30 minutes. The reaction mixture was heated at 200° C. for 3 hours, at 210° C. for 2 hours and at 220° C. for 1 hour. The temperature then was raised to and maintained at 230° C. until the acid number of the polyester was less than 10. The molten polymer was poured into a syrup can where it was allowed to cool to a white solid. The polyester thus obtained had an I.V. of 0.30, an ICI melt viscosity of 24 poise, a hydroxyl number of 34 and an acid number of 2. Differential scanning calorimetry showed a melting point at 133° C. and a heat of fusion of 8.9 cal/g. The polyester had a weight average molecular weight of 17,098 and a number average molecular weight of 5344.

REFERENCE EXAMPLE 3

Terephthalic acid (360.5 g, 2.17 mol), adipic acid (16.69 g, 0.114 mol) and butanestannoic acid (FASCAT 4100, 0.6 g) were added to a melt of 1,6-hexanediol (309.6 g, 2.62 mol) in a 1 L, 3-necked, round-bottom flask. The contents of the flask were swept with 1.0 standard cubic feet per hour (scfh) nitrogen and heated to 200° C. over a period of about 30 minutes. The reaction mixture was heated at 200° C. for 3 hours, at 210° C. for 2 hours and at 220° C. for 1 hour. The temperature then was raised to and maintained at 230° C. until the acid number of the polyester was less than 10. The molten polymer was poured into a syrup can where it was allowed to cool to a white solid. The polyester thus obtained had an I.V. of 0.191, an ICI melt viscosity at 200° C. of 3.8 poise, a hydroxyl number of 51.0 and an acid number of 0.4. Differential scanning calorimetry showed a melting point at 139° C. a crystallization temperature of 39° C. and a heat of fusion of 11.8 cal/g. The crystallization half time from the melt at 95° C. was 25 seconds and at 60° C., less than 12 seconds. The polyester had a weight average molecular weight of 7679 and a number average molecular weight of 3564.

REFERENCE EXAMPLE 4

Terephthalic acid (253.87 g, 1.523 mol), 1,4-cyclohexanedicarboxylic acid (cis:trans=about 60:40, 48.4 g, 0.27 mol), and butanestannoic acid (FASCAT 4100, 0.6 g) were added to a melt of 1,10-decanediol (369.9 g, 2.13 mol) in a 5 L, 3-necked, round-bottom flask. The contents of the flask were swept with 1.0 standard cubic feet per hour (scfh) nitrogen and heated to 200° C. over a period of about 30 minutes. The reaction mixture was heated at 200° C. for 3 hours, at 210° C. for 2 hours and at 220° C. for 1 hour. The temperature then was raised to and maintained at 230° C. until the acid number of the polyester was less than 10. The molten polymer was poured into a syrup can where it was allowed to cool to a white solid. The polyester thus obtained had an I.V. of 0.222, an ICI melt viscosity at 200° C. of 2.4 poise, a hydroxyl number of 43.0 and an acid number of 0.2. Differential scanning calorimetry showed a melting point at 116° C. and a heat of fusion of 15.1 cal/g. No crystallization temperature was observed. The crystallization half time from the melt at 95° C. was 45 seconds and at 60° C., less than 12 seconds. The polyester had a weight average molecular weight of 9746 and a number average molecular weight of 4451.

REFERENCE EXAMPLE 5

Terephthalic acid (284.25 g, 1.711 mol), 1,4-cyclohexanedicarboxylic acid (16.0 g, 0.090 mol) and butane-stannoic acid (FASCAT 4100, 0.6 g) were added to a melt of 1,10-decanediol (370.6 g, 2.31 mol) in a 1 L, 3necked, round-bottom flask. The contents of the flask were swept with 1.0 standard cubic feet per hour (scfh) nitrogen and heated to 200° C. over a period of about 30 minutes. The reaction mixture was heated at 200° C. for 3 hours, at 210° C. for 2 hours and at 220° C. for 1 hour. The temperature then was raised to and maintained at 230° C. until the acid number of the polyester was less than 10. The molten polymer was poured into a syrup can where it was allowed to cool to a white solid. The polyester thus obtained had an I.V. of 0.236, an ICI melt viscosity at 200° C. of 2.4 poise, a hydroxyl number of 42.0 and an acid number of 0.2. Differential scanning calorimetry showed a melting point at 122° C. and a heat of fusion of 16.0 cal/g. The crystallization half time from the melt at 95° C. was 15 seconds and was too fast to measure at 60° C. The polyester had a weight average molecular weight of 9915 and a number average molecular weight of 4492.

REFERENCE EXAMPLE 6

Terephthalic acid (304.0 g, 1.830 mol) and butanestannoic acid (FASCAT 4100, 0.6 g) were added to a melt of 1,10-decanediol (356.1 g, 2.046 mol) and 2,2-dimethyl-1,3-propanediol (11.2 g, 0.106 mol) in a 1 L, 3-necked, round-bottom flask. The contents of the flask were swept with 1.0 standard cubic feet per hour (scfh) nitrogen and heated to 200° C. over a period of about 30 minutes. The reaction mixture was heated at 200° C. for 3 hours, at 210° C. for 2 hours and at 220° C. for 1 hour. The temperature then was raised to and maintained at 230° C. until the acid number of the polyester was less than 10. The molten polymer was poured into a syrup can where it was allowed to cool to a white solid. The polyester thus obtained had an I.V. of 0.209, an ICI melt viscosity at 200° C. of 2.4 poise, a hydroxyl number of 46 and an acid number of 2. Differential scanning calorimetry showed a melting temperature at 123° C. and a heat of fusion of 16.0 cal/g. The polyester had a weight average molecular weight of 9786 and a number average molecular weight of 4451.

EXAMPLE 1

A powder coating composition was prepared from the following materials:

| 400.0 g | Polyester of Reference Example 1; |
| 400.0 g | Amorphous polyester - Hoechst AN745 |
| 200.0 g | Adduct of 1,3-diazetdine-2,4-dione dimer of isophorone diisocyanate - Hüls BF1540; |
| 10.0 g | Dibutyltin dilaurate; |
| 10.0 g | Benzoin; |
| 10.0 g | Modaflow flow control agent; and |
| 400.0 g | Titanium dioxide. |

The above materials were mixed in a Henschel mixer for 15 to 30 seconds and blended in a ZSK 30 extruder at a screw speed of 200 revolutions per minute. The extruder temperature profile was: feed zone=100° C., die zone=90° C. The extrudate was cooled through a chilled roll and ground in a Bantam mill to which a stream of liquid nitrogen was fed and classified through a 200 mesh screen on an Alpine sieve. The finely-divided, powder coating composition obtained had an average particle size of about 50 microns.

The powder coating composition prepared in Example 1 was applied electrostatically to one side of the 3 inch by 9 inch panels described hereinabove. The coatings were cured (cross-linked) by heating the coated panels at 350° F. (177° C.) in an oven for 20 minutes. The cured coatings were about 2.0 mils (about 50 microns) thick and passed 200 double rubs in the above-described methyl ethyl ketone test, indicating that a high degree of cross-linking had occurred.

The coatings on the panels had both front and back impact strengths of >160 inch-pounds and 20° and 60° gloss values of 98 each, and a pencil hardness of H. The coated panels passed a 0.125 inch conical mandrel test and passed the O-T T-bend flexibility test. The coating had excellent smoothness and gloss.

EXAMPLE 2

A powder coating composition was prepared from the following materials:

| 602.0 g | Polyester of Reference Example 2; |
| 258.0 g | Amorphous polyester - Hoechst AN745 |
| 140.0 g | Adduct of 1,3-diazetdine-2,4-dione dimer of isophorone diisocyanate - Hüls BF1540; |
| 6.0 g | Dibutyltin dilaurate; |
| 10.0 g | Benzoin; |
| 10.0 g | Modaflow flow control agent; and |
| 400.0 g | Titanium dioxide. |

The above materials were mixed in a Henschel mixer for 15 to 30 minutes and blended in a ZSK 30 extruder at a screw speed of 250 revolutions per minute. The extruder temperature profile was: feed zone=100° C., die zone=90° C. The extrudate was cooled through a chilled roll and ground in a Bantam mill to which a stream of liquid nitrogen was fed and classified through a 200 mesh screen. The finely-divided, powder coating composition obtained had an average particle size of about 50 microns.

The powder coating composition prepared in Example 2 was applied electrostatically to one side of the 3 inch by 9 inch panels described hereinabove. The coatings were cured by heating the coated panels at 325° F. (163° C.) in an oven for 20 minutes. The cured coatings were about 2.2 mils (about 56 microns) thick and passed 200 double rubs in the above-described methyl ethyl ketone test, indicating that a high degree of cross-linking had occurred.

The coatings on the panels had both front and back impact strengths of >160 inch-pounds and 20° and 60° gloss values of 87 and 94, respectively, and a pencil hardness of B. The coated panels passed a 0.125 inch conical mandrel test and passed the O-T T-bend flexibility test. The coating had excellent smoothness and gloss.

EXAMPLE 3

A powder coating composition was prepared from the following materials:

| 224.0 g | Polyester of Reference Example 3; |
| 96.0 g | Amorphous polyester - Hoechst AN745 |
| 80.0 g | Adduct of 1,3-diazetdine-2,4-dione dimer of isophorone diisocyanate - Hüls BF1540; |
| 4.0 g | Dibutyltin dilaurate; |
| 4.0 g | Benzoin; |
| 4.0 g | Modaflow flow control agent; and |
| 160.0 g | Titanium dioxide. |

The above materials were mixed in a small mixer and blended in a 15 mm twin-screw extruder at 135° C. and a screw speed of 200 revolution per minute. The extrudate was cooled and ground in a Bantam mill to which a stream of liquid nitrogen was fed and classified through a 200 mesh screen. The finely-divided, powder coating composition obtained had an average particle size of about 50 microns.

The powder coating composition described in the preceding paragraph was applied electrostatically to one side of the 3 inch by 9 inch panels described herein-above. The coatings were cured by heating the coated panels at 325° F. (163° C.) in an oven for 20 minutes. The cured coatings were about 2.5 mils (63.5 microns) thick and passed 200 double rubs in the above-described methyl ethyl ketone test, indicating that a high degree of cross-linking had occurred.

The coatings on the panels had both front and back impact strengths of >160 inch-pounds and 20° and 60° gloss values of 62 and 90, respectively, and a pencil hardness of B. The coated panels passed a 0.125 inch conical mandrel test and passed the O-T T-bend flexibility test. The coating had excellent smoothness and gloss.

EXAMPLE 4

A powder coating composition was prepared from the following materials:

| | |
|---|---|
| 224.0 g | Polyester of Reference Example 4; |
| 96.0 g | Amorphous polyester - Hoechst AN745 |
| 80.0 g | Adduct of 1,3-diazetdine-2,4-dione dimer of isophorone diisocyanate - Hüls BF1540; |
| 4.0 g | Dibutyltin dilaurate; |
| 4.0 g | Benzoin; |
| 4.0 g | Modaflow flow control agent; and |
| 160.0 g | Titanium dioxide. |

The above materials were mixed in a small mixer and blended in a 15 mm twin-screw extruder at 135° C. and a screw speed of 200 revolution per minute. The extrudate was cooled and ground in a Bantam mill to which a stream of liquid nitrogen was fed and classified through a 200 mesh screen. The finely-divided, powder coating composition obtained had an average particle size of about 50 microns.

The above powder coating composition was applied electrostatically to one side of the 3 inch by 9 inch panels described hereinabove. The coatings were cured by heating the coated panels at 325° F. (163° C.) in an oven for 20 minutes. The cured coatings were about 2.0 mils (about 51 microns) thick and passed 200 double rubs in the above-described methyl ethyl ketone test, indicating that a high degree of cross-linking had occurred.

The coatings on the panels had both front and back impact strengths of >160 inch-pounds and 20° and 60° gloss values of 7 and 28, respectively, and a pencil hardness of HB. The coated panels passed a 0.125 inch conical mandrel test and passed the O-T T-bend flexibility test. The coating had excellent smoothness.

EXAMPLE 5

A powder coating composition was prepared from the following materials:

| | |
|---|---|
| 224.0 g | Polyester of Reference Example 5; |
| 96.0 g | Amorphous polyester - Hoechst AN745 |
| 80.0 g | Adduct of 1,3-diazetdine-2,4-dione dimer of isophorone diisocyanate - Hüls BF1540; |
| 4.0 g | Dibutyltin dilaurate; |
| 4.0 g | Benzoin; |
| 4.0 g | Modaflow flow control agent; and |
| 160.0 g | Titanium dioxide. |

The above materials were mixed in a small mixer and blended in a 15 mm twin-screw extruder at 135° C. and a screw speed of 200 revolution per minute. The extrudate was cooled and ground in a Bantam mill to which a stream of liquid nitrogen was fed and classified through a 200 mesh screen. The finely-divided, powder coating composition obtained had an average particle size of about 50 microns.

The above powder coating composition was applied electrostatically to one side of the 3 inch by 9 inch panels described hereinabove. The coatings were cured by heating the coated panels at 325° F. (163° C.) in an oven for 20 minutes. The cured coatings were about 2.1 mils (about 53 microns) thick and passed 200 double rubs in the above-described methyl ethyl ketone test, indicating that a high degree of cross-linking had occurred.

The coatings on the panels had both front and back impact strengths of >160 inch-pounds and 20° and 60° gloss values of 7 and 28, respectively, and a pencil hardness of HB. The coated panels passed a 0.125 inch conical mandrel test and passed the O-T T-bend flexibility test. The coating had excellent smoothness.

EXAMPLE 6

A powder coating composition was prepared from the following materials:

| | |
|---|---|
| 224.0 g | Polyester of Reference Example 6; |
| 96.0 g | Amorphous polyester - Hoechst AN745 |
| 80.0 g | Adduct of 1,3-diazetdine-2,4-dione dimer of isophorone diisocyanate - Hüls BF1540; |
| 4.0 g | Dibutyltin dilaurate; |
| 4.0 g | Benzoin; |
| 4.0 g | Modaflow flow control agent; and |
| 160.0 g | Titanium dioxide. |

The above materials were mixed in a small mixer and blended in a 15 mm twin-screw extruder at 135° C. and a screw speed of 200 revolution per minute. The extrudate was cooled and ground in a Bantam mill to which a stream of liquid nitrogen was fed and classified through a 200 mesh screen. The finely-divided, powder coating composition obtained had an average particle size of about 50 microns.

The above powder coating composition was applied electrostatically to one side of the 3 inch by 9 inch panels described hereinabove. The coatings were cured by heating the coated panels at 325° F. (163° C.) in an oven for 20 minutes. The cured coatings were about 2.2 mils (about 56 microns) thick and passed 200 double rubs in the above-described methyl ethyl ketone test, indicating that a high degree of cross-linking had occurred.

The coatings on the panels had both front and back impact strengths of >160 inch-pounds and 20° and 60° gloss values of 8 and 31, respectively, and a pencil hardness of HB. The coated panels passed a 0.125 inch conical mandrel test and passed the O-T T-bend flexibility test. The coating had excellent smoothness.

EXAMPLE 7

A powder coating composition was prepared according to the procedure described in Example 1 from the following ingredients:

| | |
|---|---|
| 560.0 g | Polyester of Reference Example 1; |
| 240.0 g | Amorphous polyester - Hoechst-Celanese Alftalat AN745; |
| 191.0 g | Adduct of 1,3-diazetdine-2,4-dione dimer of isophorone diisocyanate - Hüls BF1540; |
| 9.0 g | Caprolactam-blocked isophorone diisocyanate (Hüls B1530); |
| 10.0 g | Dibutyltin dilaurate; |
| 10.0 g | Benzoin; |
| 10.0 g | Modaflow flow control agent; and |
| 400.0 g | Titanium dioxide. |

Using the procedure of Example 1, panels were coated with this powder coating composition and the coatings were cured at 325° F. (163° C.) for 20 minutes. The coatings (2.0 mils thick) had front and back impact strengths of >160 inch-pounds, 20° and 60° gloss values of 93 and 99, respectively, and a pencil hardness of 2B. The coated panels passed a 0.125 inch conical mandrel test, passed 200 methyl ethyl ketone double rubs and passed the O-T T-bend flexibility test. The coating had excellent smoothness and gloss.

This example shows that powder coating compositions containing the appropriate semi-crystalline and amorphous polyesters can be cured satisfactorily at 325° F. with a combination of cross-linking agents consisting of the adduct of the 1,3-diazetdine-2,4-dione dimer of isophorone diisocyanate and a caprolactam-blocked polyisocyanate.

COMPARATIVE EXAMPLE 1

A powder coating composition was prepared from the following materials:

| | |
|---|---|
| 850.0 g | Amorphous polyester - UCB E-3145; |
| 150.0 g | Adduct of 1,3-diazetdine-2,4-dione dimer of isophorone diisocyanate - Hüls BF1540; |
| 10.0 g | Dibutyltin dilaurate; |
| 10.0 g | Benzoin; |
| 10.0 g | Modaflow flow control agent; and |
| 400.0 g | Titanium dioxide. |

The above materials were mixed in a Henschel mixer for 15 to 30 seconds and blended in a ZSK 30 extruder at a screw speed of 200 revolutions per minute. The extruder temperature profile was: feed zone=110° C., die zone=100° C. The extrudate was cooled through a chilled roll and ground in a Bantam mill to which a stream of liquid nitrogen was fed and classified through a 200 mesh screen on. The finely-divided, powder coating composition obtained had an average particle size of about 50 microns.

The powder coating composition prepared in Comparative Example 1 was applied electrostatically to one side of the 3 inch by 9 inch panels described hereinabove. The coatings were cured (cross-linked) by heating the coated panels at 400° F. (204° C.) in an oven for 20 minutes. The cured coatings were 2.4 mils (61 microns) thick and survived only 150 double rubs, i.e., the coatings failed 200 double rubs, in the above-described methyl ethyl ketone test, indicating that a relatively low degree of cross-linking had occurred.

The coatings on the panels had front and back impact strengths of 60 and 20 inch-pounds, respectively, 20° and 60° gloss values of 79 and 97, respectively, and a pencil hardness of 2H. The coated panels passed a 0.125 inch conical mandrel test but failed the O-T T-bend flexibility test.

COMPARATIVE EXAMPLE 2

A powder coating composition was prepared by the procedure of Comparative Example 1 from the following materials:

| | |
|---|---|
| 850.0 g | Amorphous polyester - Hoechst-Celanese Alftalat AN745; |
| 150.0 g | Adduct of 1,3-diazetdine-2,4-dione dimer of isophorone diisocyanate - Hüls BF1540; |
| 10.0 g | Dibutyltin dilaurate; |
| 10.0 g | Benzoin; |
| 10.0 g | Modaflow flow control agent; and |
| 400.0 g | Titanium dioxide. |

The finely-divided, powder coating composition obtained having an average particle size of about 50 microns was applied electrostatically to one side of the 3 inch by 9 inch panels described hereinabove. The coatings were cured (cross-linked) by heating the coated panels at 400° F. (204° C.) in an oven for 20 minutes. The cured coatings were 2.2 mils (56 microns) thick and failed 100 double rubs, in the above-described methyl ethyl ketone test, indicating that the curing step had produced a low degree of cross-linking.

The coatings on the panels had front and back impact strengths of 60 and 40 inch-pounds, respectively, 20° and 60° gloss values of 90 and 97, respectively, and a pencil hardness of H. The coated panels passed a 0.125 inch conical mandrel test but failed the O-T T-bend flexibility test.

COMPARATIVE EXAMPLE 3

A powder coating composition was prepared from the materials listed below by the procedure of Comparative Example 1 except that an extruder screw speed of 250 revolutions per minute was employed.

| | |
|---|---|
| 800.0 g | Amorphous polyester - UCB E-3145; |
| 200.0 g | Adduct of 1,3-diazetdine-2,4-dione dimer of isophorone diisocyanate - Hüls BF1540; |
| 10.0 g | Dibutyltin dilaurate; |
| 10.0 g | Benzoin; |
| 10.0 g | Modaflow flow control agent; and |
| 400.0 g | Titanium dioxide. |

The finely-divided, powder coating composition obtained (average particle size of about 50 microns) was applied electrostatically to one side of the 3 inch by 9 inch panels described hereinabove. The coatings were cured by heating the coated panels at 400° F. (204° C.) in an oven for 25 minutes. The cured coatings were 2.1 mils (53 microns) thick and passed 100 double rubs in the above-described methyl ethyl ketone test, indicating that the curing step had produced a low degree of cross-linking.

The coatings on the panels had front and back impact strengths of 40 and 20 inch-pounds, respectively, 20° and 60° gloss values of 86 and 95, respectively, and a pencil hardness of H. The coated panels failed the O-T T-bend flexibility test.

Curing coated panels at 400° F. for 30 minutes did not improve the film properties but caused the resulting coating to have a slight beige color.

The invention has been described in detail with particular reference to preferred embodiments thereof, but it will be understood that variations and modifications will be effected within the spirit and scope of the invention.

I claim:

1. A thermosetting coating composition in the form of a powder having an average particle size of about 10 to 300 microns which when coated on a panel and cured to 350° C. for 20 minutes will exhibit a solvent resistance characterized by at least 200 methyl ethyl ketone (MEK) double rubs without exposing bare metal, said composition comprising:

(1) a hydroxyl polyester component comprised of:
      (A) 75 to 20 weight percent, based on the weight of the hydroxyl polyester component, of a semi-crystalline polyester having a Tg of less than 50° C., a hydroxyl number of about 20 to 100, an inherent viscosity of about 0.1 to 0.5, a melting range of about 70° to 150° C., a number average molecular weight of about 1500 to 10,000 and a heat of fusion (second heating cycle of DSC) of 5 to about 20 cal/g-°C.; and (B) 25 to 80 weight percent of an amorphous polyester having a glass transition temperature (Tg) of greater than 40° C., a hydroxyl number of about 20 to 100 and an inherent viscosity of about 0.1 to 0.5; and (2) a cross-linking effective amount of an adduct of the 1,3-diazetidine-2,4-dione dimer of isophorone diisocyanate and a diol having the structure

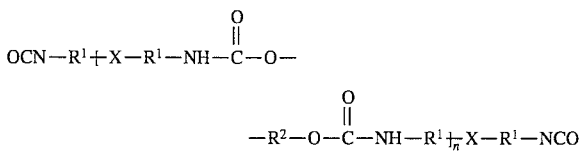

wherein $R^1$ is a divalent 1-methylene-1,3,3-trimethyl-5-cyclohexyl radical;

$R^2$ is a divalent aliphatic, cycloaliphatic, araliphatic or aromatic residue of a diol; and X is a 1,3-diazetidine-2-4,dionediyl radical; wherein the ratio of NCO to OH groups in the formation of the adduct is about 1:0.5 to 1:0.9, the mole ratio of diazetidinedione to diol is from 2:1 to 6:5, the content of free isocyanate groups in the adduct is not greater than 8 weight percent and the adduct has a molecular weight of about 500 to 4000 and a melting point of about 70° to 130° C.

2. A thermosetting coating composition according to claim 1 wherein the amorphous polyester has a Tg greater than 55° C., a hydroxyl number of about 25 to 80, an acid number of not more than 20 and an inherent viscosity of about 0.15 to 0.45.

3. A thermosetting coating composition according to claim 1 wherein the semi-crystalline polyester has a Tg of less than 30° C. a melting point of 90° to 140° C., a hydroxyl number of about 30 to 80, an inherent viscosity of about 0.1 to 0.5, a number average molecular weight of about 2000 to 6000 and a heat of fusion (second heating cycle of differential scanning calorimetry) greater than 8 cal/g-°C. and the amorphous polyester has a Tg greater than 55° C., a hydroxyl number of about 25 to 80, an acid number of not more than 20 and an inherent viscosity of about 0.15 to 0.45.

4. A thermosetting coating composition according to claim 3 containing about 10 to 25 weight percent, based on the total weight of the semi-crystalline polyester, the amorphous polyester and the cross-linking agent, of an adduct of the 1,3-diazetidine-2,4-dione dimer of isophorone diisocyanate and a diol having the structure

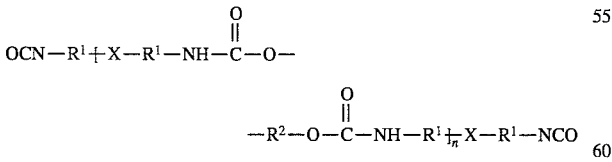

wherein $R^1$ is a divalent 1-methylene-1,3,3-trimethyl-5-cyclohexyl radical;

$R^2$ is a divalent aliphatic residue of a diol; and

X is a 1,3-diazetidine-2,4-dionediyl radical; wherein the ratio of NCO to OH groups in the formation of the adduct is about 1:0.6 to 1:0.8, the mole ratio of diazetidinedione to diol is from 2:1 to 6:5, the content of free isocyanate groups in the adduct is not greater than 8 weight percent and the adduct has a molecular weight of about 1450 to 2800 and a melting point of about 85° to 120° C.

5. A thermosetting coating composition according to claim 1 containing a cross-linking catalyst.

6. A thermosetting coating composition according to claim 4 containing a cross-linking catalyst.

7. An article coated with the reaction product of the composition of claim 1.

8. An article constructed of a metal coated with the reaction product of the composition of claim 1.

9. An article constructed of steel coated with the reaction product of claim 4.

10. The composition of claim 1, wherein component (1)(A) is present in a range of about 30 to about 60 weight percent.

11. The composition of claim 1, wherein component (1)(A) is present in about 50 weight percent.

12. An article coated with the reaction product of claim 10.

13. An article coated with the reaction product of claim 11.

14. A thermosetting coating composition in the form of a powder having an average particle size of about 15 to 75 microns comprising:

(1) a hydroxyl polyester component comprised of:

(A) 75 to 20 weight percent of a semi-crystalline polyester having a Tg of less than 30° C. a melting point of 90° to 140° C., a hydroxyl number of about 30 to 80, an inherent viscosity of about 0.1 to 0.5, a number average molecular weight of about 2000 to 6000 and a heat of fusion (second heating cycle of differential scanning calorimetry) greater than 8 cal/g-°C. and comprised of:

(i) diacid residues comprising about 80 to 98 mole percent terephthalic acid residues and about 2 to 20 mole percent 1,4-cyclohexanedicarboxylic acid residues, 1,3-cyclohexane-dicarboxylic acid residues, adipic acid residues or a mixture thereof;

(ii) diol residues comprising at least about 50 mole percent of residues having the formula —O—(CH$_2$)$_n$—O— wherein n is 4 to 12;

(B) 25 to 80 weight percent, based on the weight of the hydroxyl polyester component, of an amorphous polyester having a glass transition temperature (Tg) of greater than 55° C., a hydroxyl number of about 25 to 80, an acid number of not more than 15 and an inherent viscosity of about 0.15 to 0.45 and comprised of:

(i) diacid residues of which at least 50 mole percent are terephthalic acid residues;

(ii) diol residues of which at least 50 mole percent are 2,2-dimethyl-1,3-propanediol residues; and (iii) up to 10 mole percent, based on the total moles of (ii) and trimethylolpropane, of trimethylolpropane residues;

(2) about 5 to 30 weight percent, based on the total weight of (1) and (2), of an adduct of the 1,3-diazetidine-2,4-dione dimer of isophorone diisocyanate and a diol having the structure

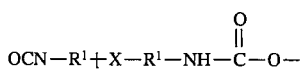

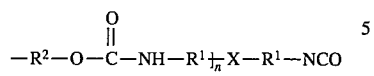

wherein $R^1$ is a divalent 1-methylene-1,3,3-trimethyl-5-cyclohexyl radical;

$R^2$ is a divalent aliphatic residue of a diol; and

X is a 1,3-diazetidine-2,4-dionediyl radical; wherein the ratio of NCO to OH groups in the formation of the adduct is about 1:0.6 to 1:0.8, the mole ratio of diazetidinedione to diol is from 2:1 to 6:5, the content of free isocyanate groups in the adduct is not greater than 8 weight percent and the adduct has a molecular weight of about 1450 to 2800 and a melting point of about 85° to 120° C.

15. A thermosetting coating composition according to claim 14 wherein about 10 to 25 weight percent of the adduct of (2) is present.

16. A thermosetting coating composition according to claims 14 wherein about 10 to 25 weight percent of the adduct of (2) is present and $R^2$ is 1,4-butanediyl.

17. A thermosetting coating composition according to claim 14 containing a cross-linking catalyst and a flow aid.

18. A thermosetting coating composition according to claim 17 containing about 10 to 25 weight percent of the adduct of (2) and $R^2$ is 1,4-butanediyl.

19. The composition of claim 14, wherein component (1)(A) is present in a range of about 30 to about 60 weight percent.

20. The composition of claim 14, wherein component (1)(A) is present in about 50 weight percent.

21. An article coated with the reaction product of claim 19.

22. An article coated with the reaction product of claim 20.

23. A thermosetting powder coating composition according to claim 14, which when coated on a panel and cured at 350° C. for 20 minutes will exhibit a solvent resistance characterized by at least 200 methyl ethyl ketone (MEK) double rubs without exposing bare metal.

24. A thermosetting coating composition in the form of a powder having an average particle size of about 15 to 50 microns comprising:

(1) a blend of polymers containing free hydroxy groups comprised of:

(A) about 20 to 80 weight percent of a semi-crystalline polyester having a Tg of less than 30° C., a melting point of 90° to 140° C., a hydroxyl number of about 30 to 80, an inherent viscosity of about 0.1 to 0.5, a number average molecular weight of about 2000 to 6000 and a heat of fusion (second heating cycle of differential scanning calorimetry) greater than 8 cal/g-°C. and comprised of:

(i) diacid residues consisting essentially of about 85 to 95 mole percent terephthalic acid residues and about 5 to 15 mole percent 1,4-cyclohexanedicarboxylic acid residues; and (ii) diol residues consisting essentially of residues having the formula $-O-(CH_2)_n-O-$ wherein n is 6 to 12;

(B) about 80 to 20 weight percent of an amorphous polyester having a glass transition temperature of about 50° to 65° C., a hydroxyl number of about 35 to 60, an acid number of not more than 10 and an inherent viscosity of about 0.10 to 0.25 and comprised of:

(i) diacid residues of which at least 50 mole percent are terephthalic acid residues;

(ii) diol residues of which at least 50 mole percent are 2,2-dimethyl-1,3-propanediol residues; and (iii) up to 10 mole percent, based on the total moles of (ii) and trimethylolpropane, of trimethylolpropane residues;

(2) about 10 to 25 weight percent, based on the total weight of (1) and (2), of an adduct of the 1,3-diazetidine-2,4-dione dimer of isophorone diisocyanate and a diol having the structure

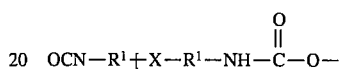

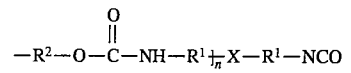

wherein $R^1$ is a divalent 1-methylene-1,3,3-trimethyl-5-cyclohexyl radical;

$R^2$ is a divalent aliphatic residue of a diol; and

X is a 1,3-diazetidine-2,4-dionediyl radical; wherein the ratio of NCO to OH groups in the formation of the adduct is about 1:0.6 to 1:0.8, the mole ratio of diazetidinedione to diol is from 2:1 to 6:5, the content of free isocyanate groups in the adduct is not greater than 8 weight percent and the adduct has a molecular weight of about 1450 to 2800 and a melting point of about 85° to 120° C.;

(3) an acrylic polymer flow aid; and (4) a cross-linking catalyst selected from organotin compounds.

25. A thermosetting coating composition according to claim 24 which also contains benzoin and wherein the semi-crystalline polyester component is comprised of diacid residues consisting of about 85 to 95 mole percent terephthalic acid residues and about 5 to 15 mole percent 1,4-cyclohexane-dicarboxylic acid residues and diol residues consisting of 1,6-hexanediol residues.

26. An article constructed of steel coated with the reaction product of the composition of claim 24.

27. The composition of claim 24, wherein component (1)(A) is present in a range of about 30 to about 60 weight percent.

28. The composition of claim 24, wherein component (1)(A) is present in about 50 weight percent.

29. An article coated with the reaction product of claim 27.

30. An article coated with the reaction product of claim 28.

31. A thermosetting powder coating composition according to claim 24 which when coated on a panel and cured at 350° C. for 20 minutes will exhibit a solvent resistance characterized by at least 200 methyl ethyl ketone (MEK) double rubs without exposing bare metal.

* * * * *

UNITED STATES PATENT AND TRADEMARK OFFICE
CERTIFICATE OF CORRECTION

PATENT NO. : 5,614,323
DATED : March 25, 1997
INVENTOR(S) : Yeong-Ho Chang

It is certified that error appears in the above-indentified patent and that said Letters Patent is hereby corrected as shown below:

Column 16, line 60, (Claim 1, line 3), " 350°C " should read --- 350°F ---.

Column 19, line 43, (Claim 23, line 3), " 350°C " should read --- 350°F ---.

Column 20, line 61, (Claim 31, line 3), " 350°C " should read --- 350°F ---.

Signed and Sealed this

Twenty-eighth Day of October, 1997

Attest:

BRUCE LEHMAN

*Attesting Officer*  *Commissioner of Patents and Trademarks*